Oct. 8, 1940.   R. H. FLEET ET AL   2,217,362
DEVICE FOR HANDLING AIRCRAFT
Original Filed Oct. 14, 1936   3 Sheets-Sheet 1

Inventors
Reuben H. Fleet
Isaac M. Laddon
William B. Wheatley
By Semmes & Semmes
Attorneys Oct. 8, 1940.   R. H. FLEET ET AL   2,217,362
DEVICE FOR HANDLING AIRCRAFT
Original Filed Oct. 14, 1936   3 Sheets—Sheet 2
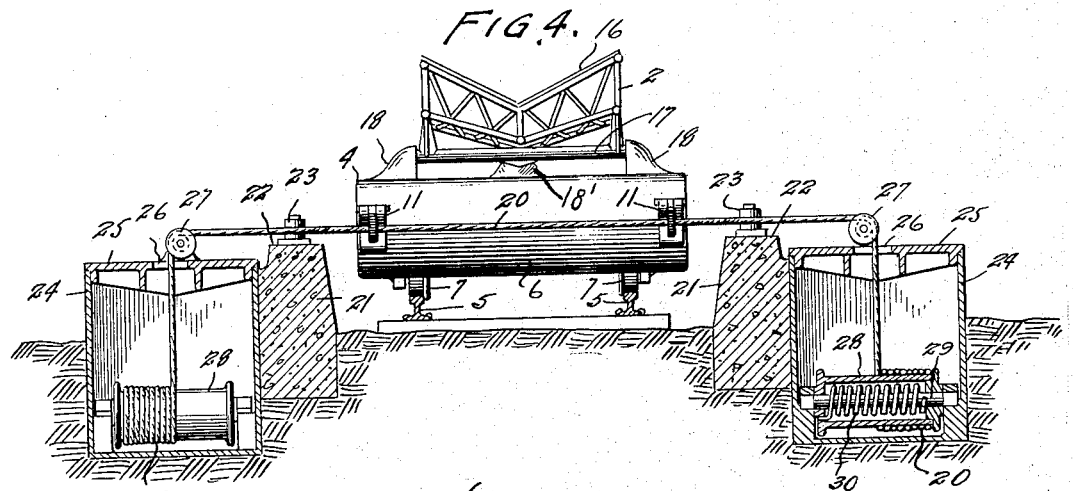
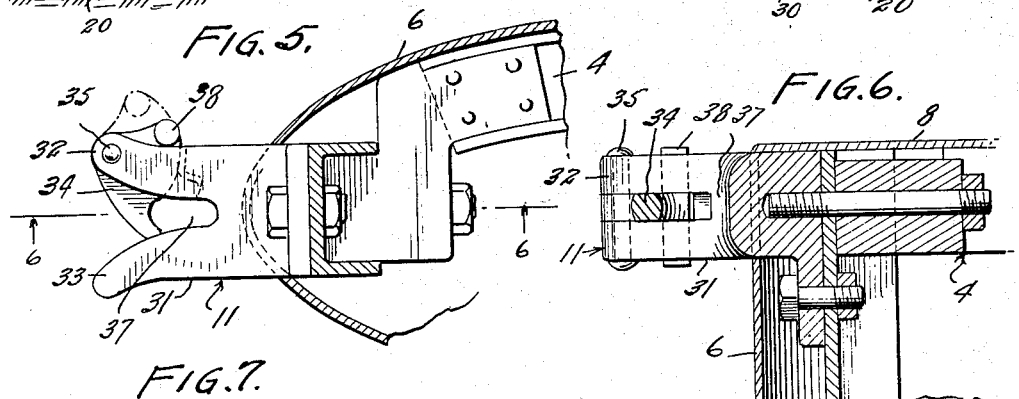
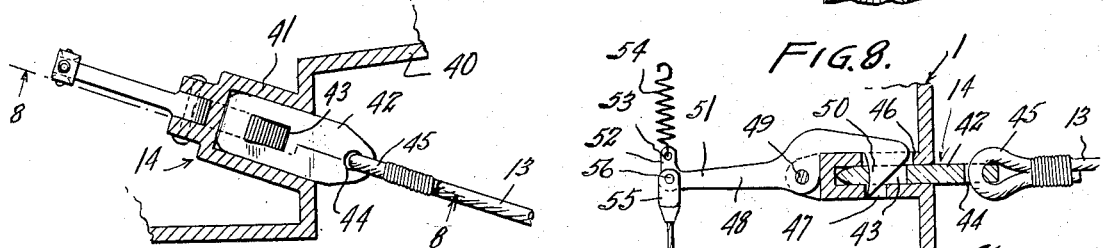
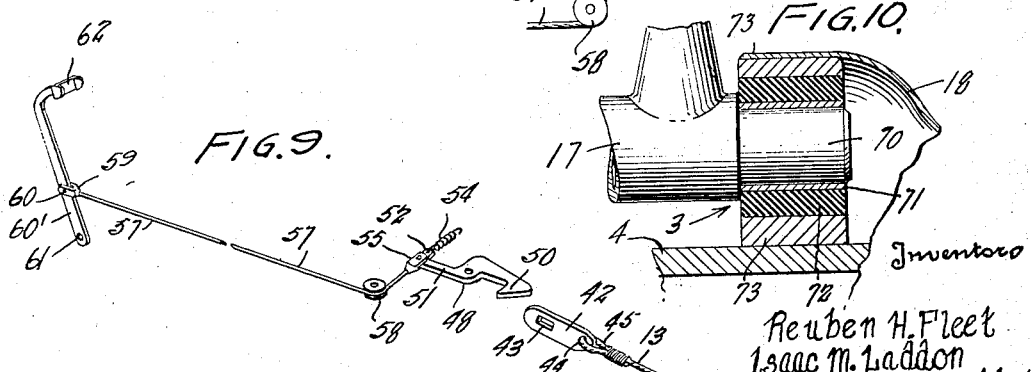
Inventors
Reuben H. Fleet
Isaac M. Laddon
William B. Wheatley
By Semmes & Semmes
Attorneys Oct. 8, 1940.   R. H. FLEET ET AL   2,217,362
DEVICE FOR HANDLING AIRCRAFT
Original Filed Oct. 14, 1936   3 Sheets-Sheet 3
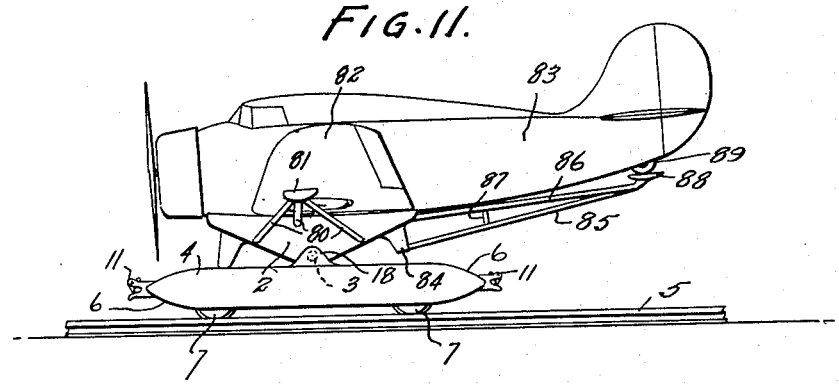
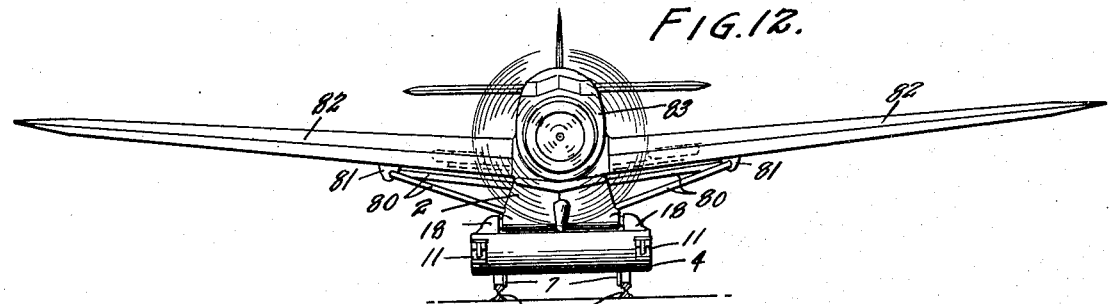
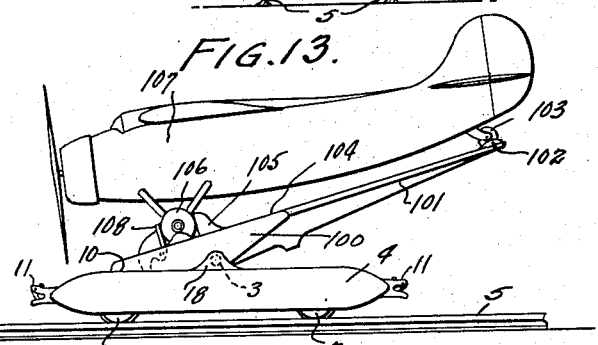
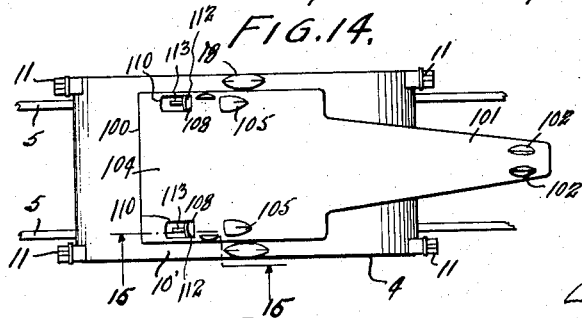
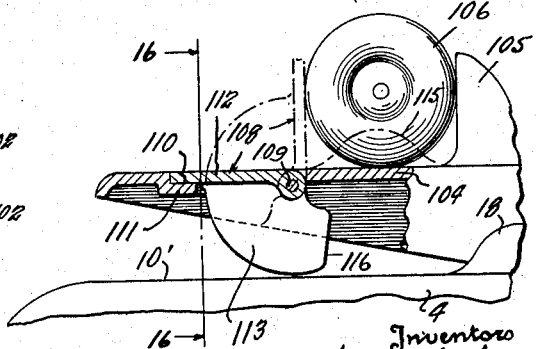

Patented Oct. 8, 1940

2,217,362

UNITED STATES PATENT OFFICE 2,217,362

DEVICE FOR HANDLING AIRCRAFT

Reuben H. Fleet, William B. Wheatley, and Isaac M. Laddon, San Diego, Calif.

Application October 14, 1936, Serial No. 105,611
Renewed February 20, 1940

8 Claims. (Cl. 244—63)

Our invention relates to airplanes, and more particularly to means for launching airplanes.

This case is a continuation in part of our application Serial No. 105,610, filed October 14, 1936.

In our application above referred to the advantages and necessities for a system permitting airplanes to be launched with larger loads than is at present possible were pointed out. This application being an improvement upon and a continuation in part of that application, the lengthy discussion of the various factors considered in that application are not repeated herein.

An object of the present invention is to provide a system in which the engagement of the arresting cable with the car is positive and will not permit the cable to become disengaged from the supporting car for the airplane.

Another object of the invention is to provide a cradle which will not be under great strain either laterally or longitudinally during the operation of the arresting system.

Yet another object of the invention is to provide a tie cable release mechanism which will permit the tie cable to be released by the pilot of the airplane when the motors have reached their full power.

A further object of the invention is to provide a cradle which is properly cushioned to prevent shocks and jars from being imparted to the pilot.

A still further object of the invention is to provide proper bracing and support constructions in connection with the cradle for launching heavy landplanes with retractible chassis.

Still another object of the invention is to provide a cradle for landplanes of the usual type in which the wheels are not retracted and in which the front wheel chock will be automatically taken out of the way just before the plane takes off from the cradle.

With these and other objects in view, which may be incident to our improvements, the invention consists in the parts and combinations to be hereinafter set forth and claimed, with the understanding that the several necessary elements comprising our invention may be varied in construction, proportions and arrangements, without departing from the spirit and scope of the appended claims.

In order to make our invention more clearly understood, we have shown in the accompanying drawings means for carrying the same into practical effect without limiting the improvements in their useful applications to the particular constructions which, for the purpose of explanation, have been made the subject of illustration.

In the drawings:

Fig. 4 is a view partly in section showing the details of the arresting gear;

Fig. 5 is a detail view partly in section of the catch for the arresting gear cable;

Fig. 6 is a view taken along the line 6—6 of Figure 5;

Fig. 7 is a view partly in section of the catch and release mechanism for releasing the tie cable;

Fig. 8 is a view taken along the line 8—8 of Figure 7, looking in the direction of the arrows;

Fig. 9 is a perspective view of the details of the catch and release mechanism;

Fig. 10 is a detail view, partly in section, showing the mounting of the cradle pivot;

Fig. 11 is a view in side elevation of a landplane with retractible chassis mounted on a special type cradle;

Fig. 12 is a view in front elevation of the device shown in Figure 11;

Fig. 13 is a view in side elevation of another form of cradle construction for landplanes with non-retractible chassis;

Fig. 14 is a top plan view of the car and cradle shown in Figure 13;

Fig. 15 is a view taken along the line 15—15 of Figure 14, looking in the direction of the arrows;

Fig. 16 is a detail view taken along the line 16—16 of Figure 15, looking in the direction of the arrows.

Figure 1:
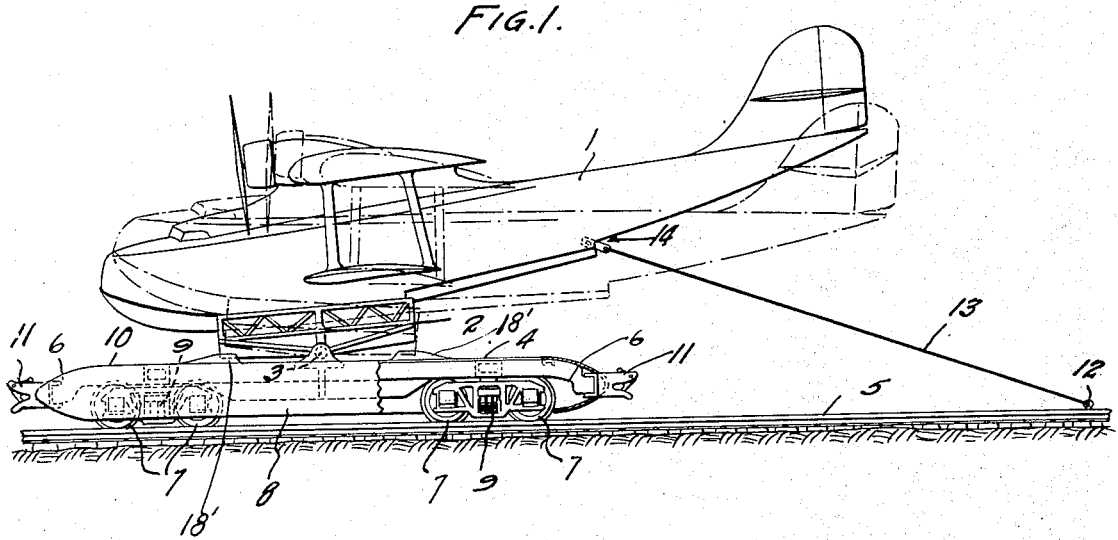
Figure 1 is a view in side elevation showing a flying boat mounted on our car and cradle construction, with the tie cable holding it from forward movement, part of the car structure being broken away to indicate the position of the parts, the no-lift attitude and lift attitudes of the airplane being indicated in solid and dotted lines respectively.
Figure 2:
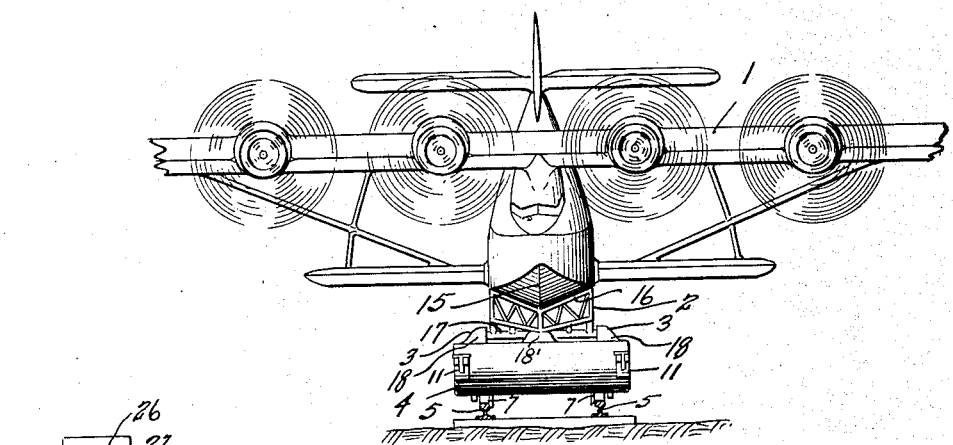
Fig. 2 is a view in front elevation of our car and cradle with the flying boat mounted on it, portions of the wings of the flying boat being broken away.
Figure 3:
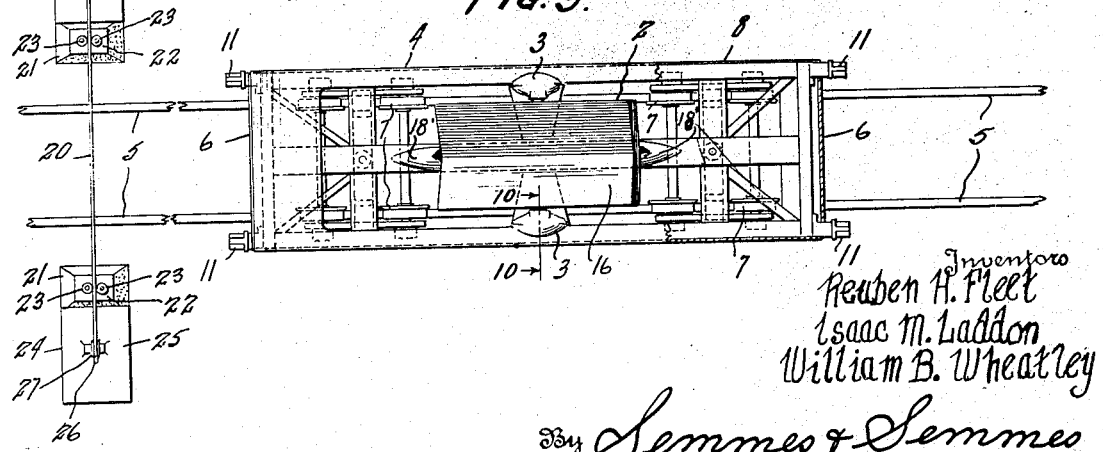
Fig. 3 is a top plan view of our car and cradle with an arresting gear in place adjacent one end of the car.

Referring to the drawings, in Figures 1, 2 and 3, we have shown a flying boat 1 mounted on a cradle 2 pivoted at 3 on a supporting car 4 adapted to travel on tracks 5. The car 4 is formed with streamlined ends 6 which may be made from sheet metal. The wheels 7 are protected within side sheathing 8. There are two tracks shown for the car 4, which are provided with spring suspensions 9 at either end for support of the car body 10. At either end of the car are provided catches 11 for arresting gear cables which, as indicated in the above referred to application, can be placed at either end of the track.

Attached to the track 5 is an eye 12 which carries a tie cable 13 which is in turn attached to a catch and release mechanism 14 carried by the plane.

The catch and release mechanism is adapted to be operated by the pilot when the motors have been speeded up to full throttle. In the particular mechanism shown in the drawings the foot power of the pilot is adapted to effect the release of the tie cable 13. The details of this catch and release mechanism will be later described.

The bottom of the flying boat 1 which is in general somewhat V-shaped in cross section, as indicated at 15 Figure 2, is adapted to rest on a V-shaped upper surface 16 formed on the cradle 2. The cradle 2 can be made of braced structural elements indicated in the drawings, or other types of construction can be used. The cradle 2 is provided with a shaft 17 which is pivoted at 3 at either end in support members 18 attached to the top of the car 4. Across the track and at either end thereof are adapted to be stretched arresting gear cables 20.

In the drawings, in Figures 1, 2, 3 and 4, there are shown guides on the vehicle at the front and back of the cradle which act as braces. These guides we have designated by the numeral 18'.

Adjacent either side of the track 5 are placed concrete support members 21 which carry on their upper surfaces 22 two rollers 23 each, through which the cable 20 runs. The construction is such that the cable can freely pass between the rollers and be stretched in either direction by movement of the car 4 after the cable is engaged in the catches 11. Housing compartments 24 are provided adjacent to and contacting with supports 21. Each housing compartment 24 is provided with a top 25 having an aperture 26 through which passes a cable 20, passing over a roller 27. The cable 20 is wound at either end on drums 28 which rotate on axles 29. Each drum 28 is attached at one end to a spring 30 which is attached at its other end to an axle 29.

The arrangement is such that when the car 4 presses against a cable 20 through its catch and release elements 11, the springs 30 permit the drums to rotate and the arresting gear cables 20 are drawn out, in the meantime tightening up the springs 30 so that increasing tension is imparted to the arresting gear cable 20.

While we have shown one particular type of arresting gear which may be employed, it is to be understood that there are many types which may be used, and that the showing is merely illustrative of one form of arresting gear arrangement which can be used.

Each catch 11 comprises a guide member 31 comprising a bifurcated construction having an upper arm 32 and a lower arm 33. Each upper arm 32 carries a pivoted catch 34 which is pivoted at 35 in the upper arm 32, and is adapted to fall in the position shown in solid lines in Figure 5, after the cable has passed into its position against the bottom of the passageway 37 formed at the base of the bifurcated arms 32 and 33. A support pin 38 prevents the pivoted catch 34 from swinging further than is necessary to close the throat opening between the bifurcated arms 32 and 33.

The upper position of the pivoted catch 34 is shown in dotted lines in Figure 5. The catch 34 is adapted to be pressed into this position when the arresting gear cable 20 passes into position in the slot between the bifurcated arms 32 and 33, and falls by gravity into the solid line position shown in Figure 5 when the cable has been engaged.

The catch and release mechanism indicated at 14 in Figure 1 for the tie cable 13 is illustrated in detail in Figures 7, 8 and 9. In the bottom 40 of the flying boat 1 is provided a housing 41 in in which is adapted to slide a bar 42 provided with an aperture 43. The bar 42 has an eye 44 which fits a loop 45 of the cable 13.

The housing 41 is provided at one side with an aperture 46 and at the other side with a smaller aperture 47. There is a latch 48 which is pivoted at 49 on the housing 40. The latch 48 is provided with a downturned end 50 which in a holding position fits within the aperture 46 in the housing 40, and extends through the aperture 43 in the bar 42 and thence into the aperture 47 formed in the housing 41.

With the parts in the position shown in Figure 8, the tie cable 13 is held firmly attached to the flying boat 1.

The latch 48 is provided with an arm 51 having an angularly formed extension 52 provided with an eye 53 to which is attached a spring 54. The other end of the spring 54 is attached to some of the interior structure of the airplane and is tensioned to hold the arm 51 in the position shown in Figure 8. The latch is released against the tension of the spring 54. The mechanism for releasing the latch comprises a cable holding member 55 pivoted at 56 to the arm 51 and carrying a cable 57 which is adapted to run over a pulley 58 suitably supported in the interior of the airplane. The cable 57 is provided at its other end with a cable holding member 59, pivoted at 60 to a foot lever 60', that is pivoted at 61 to a supporting structure, not shown. The foot lever 60' is provided with a foot bar 62 adapted to be pressed by the foot of the pilot.

When the pilot presses the foot bar 62 with his foot the foot lever 60' is moved forward to pull on the cable 57 which pulls on the arm 51 to release element 50 from the hole 43 in the bar 42, thus disengaging the tie cable and permitting the airplane and its carriage to go forward unimpeded.

The tie cable mechanism just described permits the engine to be under full power before any movement of the airplane is permitted. This shortens the run and the length of time necessary to get the airplane into the air.

In order to support the flying boat 1 in a manner which will prevent shocks to be imparted to the plane, we not only have the car 4 mounted on a spring suspension, but we have provided that the shaft 17 upon which the cradle 2 is pivoted is resiliently supported. In order to effect this resilient support of the shaft 17, we have at either end provided a reduced section 70 of the shaft with a journaled bushing 71 in which the shaft is adapted to turn, this journaled bushing being mounted in a rubber ring 72 and supported in a support structure 73. The rubber ring 71 resiliently supports the shaft 17 and minimizes shocks and jars.

Referring to Figures 11 and 12, we have shown a construction of cradle which is particularly adapted for use with landplanes having retractible chassis. In such type of construction the bottom of the landplane is in general rounded. In order to support the plane properly in the cradle, we have shown the cradle 2 provided with outrigger support arms 80 carried in supports 81. The outrigger arms 80 may be joined to the side of the cradle and in general we employ a construction embodying three arms 80, as indicated in Figure 11. The end supports 81 may fit under the wings 82 of a landplane 83. This construction provides lateral support to prevent rolling of the landplane 83 during its transport upon the cradle 4.

In order to support the airplane to give it longitudinal stability, we have shown the cradle 4 provided with a downward bracing member 84 to which is attached an arm 85. To the upper part of the cradle 4 is attached an arm 86. The arms 85 and 86 are joined by a strengthening connecting element 87. The end of the two arms 85 and 86 are joined together and support an end support 88 for the tail. This end support 88 in general will be positioned so as to support the tail skid wheel 89 which is shown in Figure 11 as partly retracted. Thus longitudinal stability of the plane 83 is achieved as well as the lateral stability.

In Figures 13 to 16 inclusive we have shown another type of construction for a landplane having a non-retractible chassis. Here the problem of preventing the rolling of the landplane off the cradle is important. We have shown pivoted at 3 on the supports 18 a cradle 100 which is provided with a tail 101 heaving side braces 102. The side braces 102 lie on either side of the tail skid wheel 103 and prevent its movement laterally. The cradle is provided on its main supporting surface 104 with rear chocks 105 which are adapted to lie in rear of the wheels 106 of a landplane 107. In front of the wheels 106 are movable chocks 108.

The movable chocks 108 are pivoted at 109 in the body 104 of the cradle 100. Apertures are provided at 110 in the main body 104 of the cradle 100, and supporting lips 111 at the front of the apertures 110 are adapted to support the upper surface 112 of each chock 108.

Each chock 108 is provided with a round cam-like element 113 which is joined to the upper surface 112. In addition to the supporting lip 111 at the front of the aperture 110 there are provided supporting lips 114 formed from the upper surface 10 of the car 4.

Side braces 115 are provided between the chocks 105 and the movable chocks 108 to prevent the wheels 106 from sliding laterally.

When the front chocks 108 are in their raised position, indicated in dotted lines in Figure 15 and in solid lines in Figure 13, the wheels 106 cannot roll forward. In such position the cam-like members 113 have flat surfaces 116 which rest on the upper surface 10' of the car 4.

When the landplane 107 has its control surfaces manipulated to change it from a no-lift attitude, such as is shown in Figure 13, the front chocks 108 fall by gravity into the position shown by solid lines in Figure 15 and permit the wheels 106 to roll off the car 4 and the airplane 107 to take to the air.

It is to be understood that in all of the types of cradles in all of the drawings the airplane is adapted to start off in a no-lift attitude and that it is changed from the no-lift attitude by manipulation of the control surfaces of the plane only when sufficient speed has been picked up to permit the airplane to fly off the cradles. All this is explained in our co-pending application previously referred to.

While we have shown and described the preferred embodiment of our invention, we wish it to be understood that we do not confine ourselves to the precise details of construction herein set forth by way of illustration, as it is apparent that many changes and variations may be made therein, by those skilled in the art, without departing from the spirit of the invention, or exceeding the scope of the appended claims.

We claim:

1. An airplane supporting structure comprising a movable member, a cradle pivoted on the movable member on which the airplane is adapted to rest, guides on the movable member at the front and the back of the cradle to act as braces.

2. An airplane supporting structure comprising a car, a track for the car, a cradle pivoted on the car, guides on the car adjacent the sides of the cradle near the mid point thereof adapted to hold the cradle in line on the car in either lift or no lift attitude of the airplane, and guides on the car at the front and back of the cradle to act as braces.

3. In a system for launching airplanes from vehicles movable upon a track, a vehicle adapted to run upon a track and support an airplane for launching, cable grippers on the sides of the vehicle at the end thereof, each of said cable grippers having a notch adapted to receive a horizontally disposed arresting gear cable, each of said cable grippers being mounted upon the vehicle at the substantially same height, a pivoted keeper having a mounted position on each cable gripper, said keeper being adapted to lock a cable against lateral movement from the notch, said keeper having its center of gravity below its point of pivoting whereby the keeper will normally move by gravity to its locked position, said keeper being displaceable out of its locked position by the cable upon the entrance of the cable into the notch, said displacement permitting the cable to enter to the full depth of the notch and pass the keeper, whereby the cable may be locked in the cable gripper.

4. In a system for launching airplanes from vehicles movable upon a track, a vehicle adapted to run upon a track and support an airplane for launching, cable grippers on the sides of the vehicle at the end thereof, each of said cable grippers having a notch adapted to receive a horizontally disposed arresting gear cable, each of said cable grippers being mounted upon the vehicle at the substantially same height, a pivoted keeper having a mounted position on each cable gripper, said keeper being adapted to lock the cable against lateral movement from the notch, said keeper having its center of gravity below its point of pivoting whereby the keeper will normally move by gravity to its locked position, said keeper being displaceable out of its locked position by the cable upon the entrance of the cable into the notch, said displacement permitting the cable to enter to the full depth of the notch and pass the keeper, whereby the cable may be locked in the cable gripper, an arresting cable, means to support the arresting cable in position to be gripped by the cable grippers at each side of the vehicle, whereby the vehicle may be arrested without tipping thereof.

5. An airplane supporting structure comprising a movable member, a cradle on which the airplane is adapted to rest, means to pivot the cradle on the movable member in a horizontal plane, and guides on the movable member at the front and back of the cradle to act as braces.

6. An airplane supporting structure comprising a car, a cradle on which the airplane is adapted to rest, means to pivot the cradle on the car in a horizontal plane, members on the car adjacent the sides of the cradle adapted to hold the cradle in line on the car in either lift or no-lift attitude of the airplane, and guides on the car at the front and back of the cradle to act as braces.

7. An airplane supporting structure comprising a car, a cradle on which the airplane is adapted to rest, means to pivot the cradle on the car in a horizontal plane, guides on the car adjacent the sides of the cradle near the mid point thereof adapted to hold the cradle in line on the car in either lift or no-lift attitude of the airplane, and guides on the car at the front and back of the cradle to act as braces.

8. An airplane supporting structure comprising a car, a cradle on which the airplane is adapted to rest, means to pivot the cradle on the car in a horizontal plane, guides on the car adjacent the sides of the cradle near the mid point thereof adapted to hold the cradle in line on the car in either lift or no-lift attitude of the airplane, and additional guides on the car to act as braces for the cradle.

REUBEN H. FLEET.
WILLIAM B. WHEATLEY.
ISAAC M. LADDON.